United States Patent [19]

Herbet

[11] Patent Number: 4,942,911
[45] Date of Patent: Jul. 24, 1990

[54] HOPPER ASSEMBLIES
[75] Inventor: Abel Herbet, Paris, France
[73] Assignee: BTR Industrial Holdings, Ltd., London, England
[21] Appl. No.: 213,256
[22] Filed: Jun. 29, 1988
[30] Foreign Application Priority Data Jun. 30, 1987 [GB] United Kingdom ............... 8715364

[51] Int. Cl.⁵ ............................................. B65G 65/30
[52] U.S. Cl. ..................................... 141/359; 141/59; 222/494; 414/291; 403/87; 403/92
[58] Field of Search ............ 141/59, 65, 93, 348–350, 141/360, 367, 359; 222/494, 491, 511, 515, 517; 414/291–293, 199, 200, 208, 299; 193/17, 18, 20, 21, 32; 160/181, 184–187; 16/338, 341, DIG. 13; 403/87, 98, 92

[56] References Cited

U.S. PATENT DOCUMENTS

| | | | |
|---|---|---|---|
| 2,761,186 | 9/1956 | Peterson | 222/491 |
| 2,889,906 | 6/1959 | Linderoth | 193/32 |
| 3,365,240 | 1/1968 | Gordon | 222/494 |
| 3,923,210 | 12/1975 | Jackson | 222/494 |
| 4,037,754 | 7/1977 | Wilhelmi et al. | 141/350 |
| 4,324,524 | 4/1982 | Burston et al. | 414/291 |
| 4,411,298 | 10/1983 | Ellingsen et al. | 403/87 |

FOREIGN PATENT DOCUMENTS

| | | |
|---|---|---|
| 1935553 | 1/1971 | Fed. Rep. of Germany . |
| 2525703 | 12/1976 | Fed. Rep. of Germany . |
| 0277818 | 9/1927 | United Kingdom . |
| 382376 | 10/1932 | United Kingdom . |
| 0441200 | 1/1936 | United Kingdom . |
| 600237 | 4/1948 | United Kingdom . |
| 921010 | 3/1963 | United Kingdom . |

Primary Examiner—Henry J. Recla
Assistant Examiner—Casey Jacyna
Attorney, Agent, or Firm—Merchant, Gould, Smith, Edell, Welter & Schmidt

[57] ABSTRACT

A hopper assembly has an upwardly facing mouth for receiving granular or powder materials, and structured and arranged for preventing or reducing the escape of material from the hopper. The assembly includes at least one resiliently flexible baffle extending obliquely downwards from a substantially fixed, generally horizontally extending top edge portion to a free edge portion. Another member may be provided having an edge portion in the vicinity of and extending substantially parallel to the free edge portion of the baffle. The baffle is arranged with respect to the other member such that if material to be received by the hopper assembly falls onto the baffle, the weight of the material tends to cause the baffle to deflect away from the other member, permitting the material to fall between the baffle and the other member. Being resilient, the baffle returns or tends to return to its original position.

14 Claims, 5 Drawing Sheets

HOPPER ASSEMBLIES

The invention relates to hopper assemblies for receiving granular or powder materials.

It is well known for a material in granular or powder form to be delivered to, for example, a factory in lorries or railway hopper wagons that pour their contents into a receiving hopper provided for the purpose. Many such materials tend to produce dust, and it has been found that the quantities of dust that arise from receiving hoppers during pouring can be both wasteful and environmentally undesirable.

It has been proposed to extract dust-laden air from the upper part of the receiving hopper through filters, but on its own that is not satisfactory because the size of the hopper opening means that very large volume flow rates of air must be extracted and filtered.

It has been proposed to close the mouth of the hopper with pivotally mounted baffles of inverted V-shaped cross section hanging under gravity, but it has been found that the pivots sometimes clog with dust and jam, that under a sudden impact of falling material the baffles may pivot too far and allow dust-clouds to escape between them, and that considerable piles of some materials can form on top of the baffles without becoming unbalanced and causing the baffles to pivot at all.

The invention provides a hopper assembly having an upwardly facing mouth for receiving granular or powder materials, and means for assisting in preventing or reducing the escape of material from the hopper, which means comprises at least one resiliently flexible baffle extending obliquely downwards from a substantially fixed, generally horizontally extending top edge portion to a free edge portion, and another member having an edge portion in the vicinity of and extending substantially parallel to the free edge portion of the baffle, the arrangement being such that if material to be received by the hopper assembly falls onto the baffle its weight tends to cause the baffle to deflect away from the said other member, permitting the material to fall between the baffle and the other member, and that the baffle then returns or tends to return to its original position. The term "hopper assembly" is to be understood as including any structure for receiving materials poured into it, and not limited to structures in which a reserve of the material is kept immediately below the mouth and from which the material is extracted by gravity.

The said other member may be another resiliently flexible baffle extending obliquely downwards from a substantially fixed, generally horizontally extending top edge portion to a free edge portion in the vicinity of and extending substantially parallel to the free edge portion of the first-mentioned baffle. The hopper assembly then advantageously comprises two rows of resiliently flexible baffles forming a substantially symmetrical array of generally V-shaped vertical crosssection, with the free edge portions of the baffles along the centre of the array and the top edge portions of the baffles along the sides of the array. If there are two said arrays of baffles side by side, they are advantageously separated by a common supporting member to which the adjacent top edge portions of the baffles of both arrays are fixed. If there are more than two such arrays, then each array (except for the two outermost) may share a common supporting member with those on both sides of it.

According to one arrangement, the hopper assembly may comprise means for adjusting the angle of obliquity, with respect to the horizontal, of the fixed edge portion of the baffle or baffles. The fixed edge portion of the or each baffle is then advantageously mounted pivotably about a horizontal axis, and adjustable means provided for enabling the baffle to be prevented from pivoting under the action of gravity from any of a range of angular positions about the axis of pivoting. The pivotal position of the baffle is preferably determined by the effective length of one or more bolts extending between the baffle and a fixed member and so arranged that adjustment can be effected by screwing a nut along each such bolt.

The or each baffle may be so mounted as to permit adjustment of the distance from the axis of pivoting to the free edge.

According to another arrangement, the fixed edge portion of the baffle is mounted in a support member which is shaped to permit restricted pivotal movement of the baffle about a horizontal axis and means is provided for securing the baffle in a desired pivotal position. The fixed edge portion of the baffle may be shaped to form a cylindrical support portion and the support member may be a tube in which the support portion is located, the baffle extending from the tube through a slot in the wall of the tube.

Where the baffles are adjustably mounted, they can be set to a desired setting when they are installed and will usually need only occasional adjustment, so that any tendency for the adjusting means to clog with dust will not hinder the day-to-day operation of the baffles.

Means may be provided for extracting air from below the said at least one baffle.

The or each resiliently flexible baffle may comprise a sheet of elastomeric material.

The or each baffle may comprise an upper layer of wear-resistant material and a lower layer of resilient material.

Alternatively, the baffle may comprise a sheet of material with stiffening ribs on one surface. In this case, the baffle may be moulded in one piece from a elastomeric material.

The invention also provides a kit of parts for a hopper assembly according to the invention, comprising a resiliently flexible baffle and means for fixing the baffle to a fixed member of the hopper assembly.

Where the baffles are to be adjustably mounted, the kit preferably includes the adjusting means and a mounting that is to be fastened to some fixed part of the hopper assembly to provide an anchorage for the baffles and the adjusting means.

The kit may provide the components necessary for converting an existing receiving hopper assembly into a hopper assembly according to the invention.

Hopper assemblies constructed in accordance with the invention will now be described by way of example only with reference to the accompanying drawings, in which.

Figure 1:
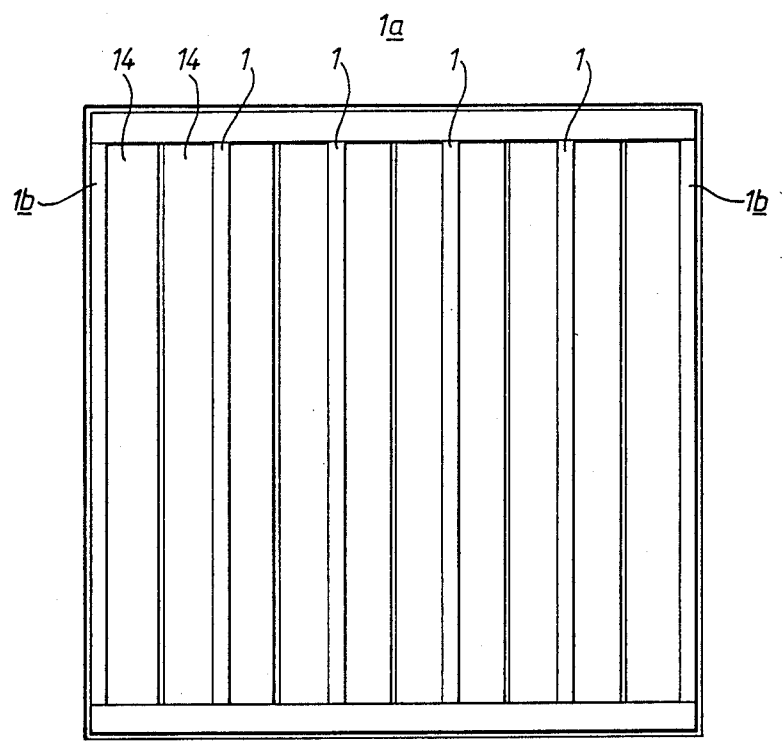
FIG. 1 is a schematic plan view of a hopper assembly in an inoperative state.

Referring to FIGS. 1 to 4 of the drawings, one form of hopper assembly includes a receiving hopper 20 (not shown in detail) disposed under an opening in a floor 1a which opening is spanned by a plurality of beams 1 and forms a mouth for the hopper assembly. As may be seen from FIG. 3, the beams 1 are I-beams with their lower flanges prismatic to prevent material from piling up on the flanges. The spaces between the beams 1 are covered by grids 2 resting on the beams 1. The grids 2 have been omitted from FIG. 1 for clarity. The beams 1 and grids 2 support the weight of lorries that may drive over the hopper, while permitting granular or powder materials discharged by the lorries to fall through the grids into the hopper. The beams 1 and grids 2 may be conventional and will not be described in detail.

Welded to both sides of the web of each beam 1 spanning the hopper opening, and the exposed sides of a pair of beams 1b parallel to the beams 1 and defining the ends of the opening, are brackets 3 extending the length of the beams. Each bracket 3 has vertical pivot plates 4 projecting from it at both sides of the opening and at regular intervals in between. There is a horizontal lug 5, joined both to the bracket 3 and to the pivot plate 4, on each side of each pivot plate except on the outer sides of the pivot plates at the sides of the opening. Between the pivot plates 4 of each pair of adjacent pivot plates on a bracket 3 extends a mounting member 6 having at each end a downwardly-projecting lug 7 that is pivotably attached to the adjacent pivot plate 4 by means of a bolt 8. Each mounting member 6 is bent downwards at the edge portion further from the bracket 3. A bolt 9 extends generally vertically through a hole 10 in each lug 5 and a hole 11 in the mounting member 6 above, terminating above the mounting member in a head 12 in the form of a crossbar of circular section and having a nut 13 screwed onto it below the lug 5.

Each mounting member 6 has on it a flap 14 in the form of a sheet of resilient material approximately as long as the mounting member. The flaps 14 may overhang the pivot plates 4 in order to abut one another closely end to end, and if they do so then the mounting members 6 will not necessarily do the same. On top of each flap 14, above the mounting member 6, is a seal plate 15 that abuts, and may be secured to, the underside of the upper flange of the adjacent beam 1. The flap 14 and the seal plate 15 are secured to the mounting plate 6 by several bolts 16 that pass through holes in the flap and transverse slots 17 in the mounting member and the seal plate.

Each flap 14 is a laminate of a lower layer of elastomeric material giving a desired stiffness and flexibility to the flap, and a thinner upper layer of material that has a higher wear resistance than the elastomeric material but would not on its own be stiff enough.

The support members 6 and flaps 14 are positioned with the flaps sloping downwards towards their free sides, and the free side edge of each flap, in a resting condition, being closely adjacent to that of the flap opposite on the facing side of the next beam 1. As will be seen from the drawing, the flaps 14 are held in their sloping position by the bolts 9 acting in tension between the horizontal lugs 5 and the support members 6, and their angle can be adjusted by loosening or tightening the nuts 13. The positions of the flaps 14 can also be adjusted by sliding the bolts 16 up or down the slots 17.

In normal use, the interior of the receiving hopper is maintained under a pressure lower than ambient pressure by fans (not shown), which draw dustladen air continuously from the interior of the hopper through ducts 18 and filters (not shown). Because air is withdrawn from within the hopper, there is a flow of air into the hopper between the free side edges of the flaps 14. The position of the flaps 14 is so set, by tightening or loosening the nuts 13 on the bolts 9 and by moving the bolts 16 up or down the slots 17, that any appreciable additional weight on the flaps causes them to deflect and to gape apart at their free sides, as shown in FIG. 2, enabling any granular or powder material that has fallen on them to fall through between the flaps, assisted by the slope of the flaps downwards towards the gap (the gradient of which slope increases as the flaps deflect) and by the air current that is drawn downwards through the gap by the fan. As soon as material ceases to fall onto or lie on the flaps 14, they return under the action of the resilience of their elastomeric material to the closed position shown in FIG. 1. If dust arises when the granular or powder material falls into the hopper, very little of the dust can escape, because of the flaps 14 and because of the downward flow of air through any gaps. When the flow of material into the hopper has ceased, the continuing flow of air into the hopper between the flaps 14 continues to prevent the escape of dust and also removes dust that might otherwise remain on the outer surfaces of the grids 2, the beams 1 and the flaps and carries that dust into the hopper. The volume rates of flow of air involved, and hence the size and power consumption of the fans and their associated filters, are far lower than would be necessary with only fixed baffles. The seal plates 15 both prevent leakage of air and dust round the upper sides of the mounting members 6 and prevent the granular or powder material from penetrating into, and possibly jamming, the mountings for the flaps which, although they are not moving parts in use, may need to be adjusted from time to time.

As an example of dimensions that may be used, in the case of a hopper that is to receive materials from lorries or railway wagons, the beams 1 may be spaced about 1 meter apart, the pivot plates 4 may be spaced about 70 cm apart, the flaps 14 may be about 40 cm wide in a direction perpendicular to the lengths of the beams 1 and the mounting members 6 may be about 20 cm wide. The flaps 14 may consist of an upper layer of 7 mm thick polyester-reinforced conveyor-belt rubber and a lower layer of 10 mm thick natural rubber such as that sold in France by Kleber under the designation "Feuille CV", having a DIDC hardness of 40. The number of beams 1 employed depends on the dimensions of the hopper and, for any particular hopper, can be varied to some extent. If fewer beams are employed, the distance between them increases and the flaps 14, if set at the same angle, will then penetrate more deeply into the hopper. If the flaps 14 penetrate too deeply into the hopper they will reduce the capacity of the hopper and there will also be a risk that they will contact the material within the hopper; the spacing between the beams 1 should, of course, be selected to ensure that that does not occur.

Figure 5:
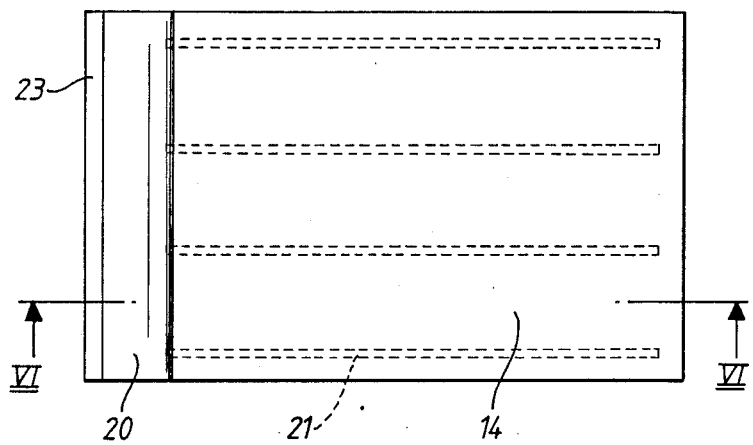
FIG. 5 is a plan view of a component of another hopper assembly.
Figure 6:
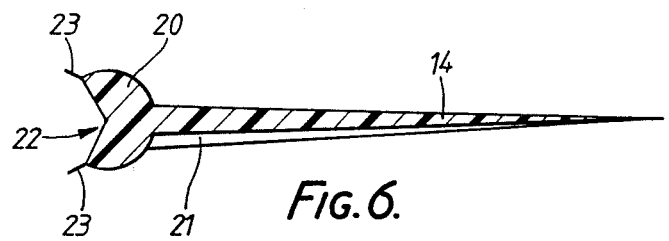
FIG. 6 is a view on the line VI—VI of FIG. 5.

FIGS. 5 and 6 show another form of resiliently flexible flap 14. The flap includes a support portion 20 along one edge and stiffening ribs 21 on one surface (in use, the undersurface) and is moulded in one piece from an elastomeric material, for example polyurethane. The support portion 20 has a circular cross-section and, running the length of the support portion, is a groove 22 of V-shaped cross-section. The mouth of the groove is directed away from the flap and along each edge of the mouth is an outwardly-directed lip 23. The thickness of the flap adjacent the support portion 20 is substantially less than the diameter of the cross-section of the support portion and it decreases steadily towards the opposite end of the flap. The stiffening ribs 21 extend from the support portion 20 towards the opposite end of the flap and decrease steadily in height.

Figure 2:
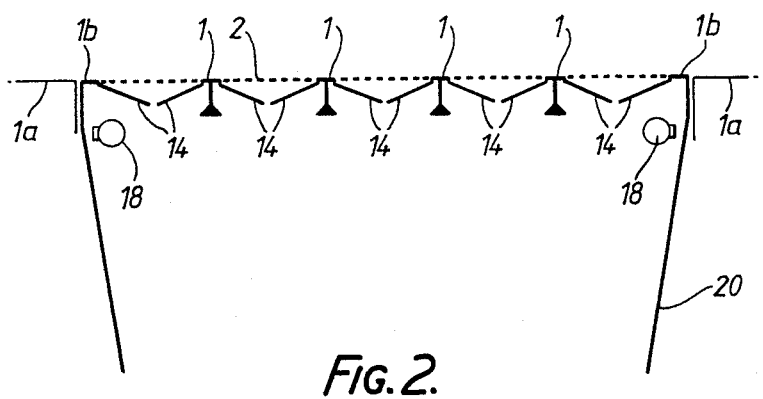
FIG. 2 is a schematic cross-sectional view in a vertical plane through the assembly in an inoperative state.
Figure 3:
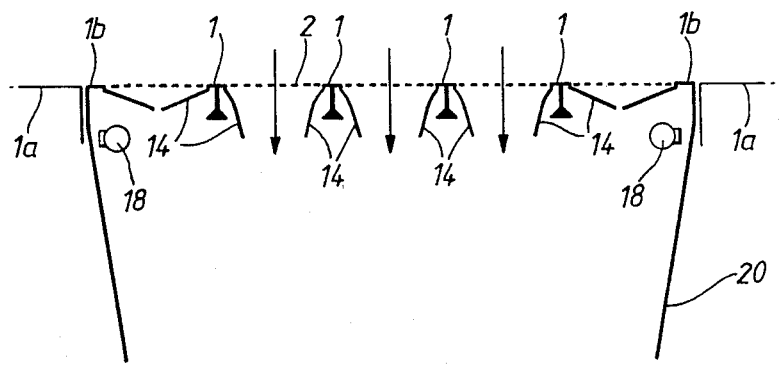
FIG. 3 is a view similar to FIG. 2 showing the assembly in an operative state.
Figure 4:
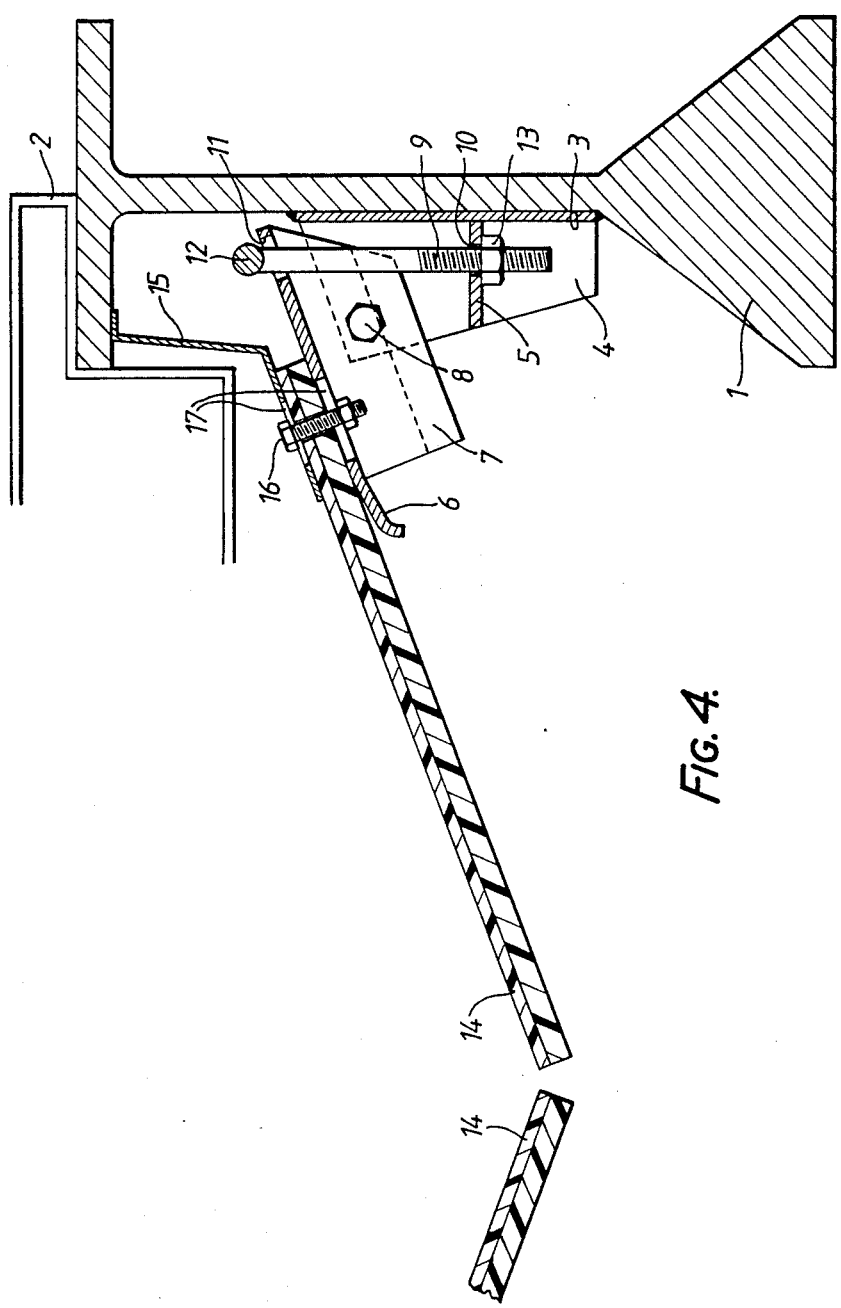
FIG. 4 is a more detailed view of part of the assembly as shown in FIG. 1.
Figure 7:
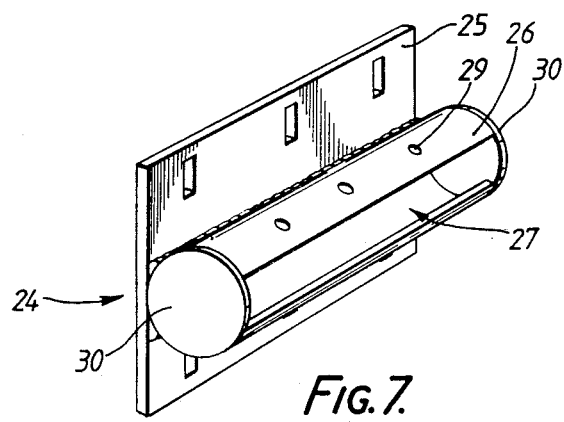
FIG. 7 is a perspective view of another component of this hopper assembly.

The flap is mounted by a bracket 24 (FIGS. 7 and 8) on one of the I-beams 1 that span the mouth of the hopper (FIGS. 1 to 3). The bracket 24 comprises a rectangular plate 25 which in use is secured to the side of a beam and to which is welded a tube 26 which extends the length of the plate 25. On the side of the tube 26 away from the plate 25 a comparatively wide slot 27 is cut in the wall of the tube and extends the length of the tube.

Figure 8:
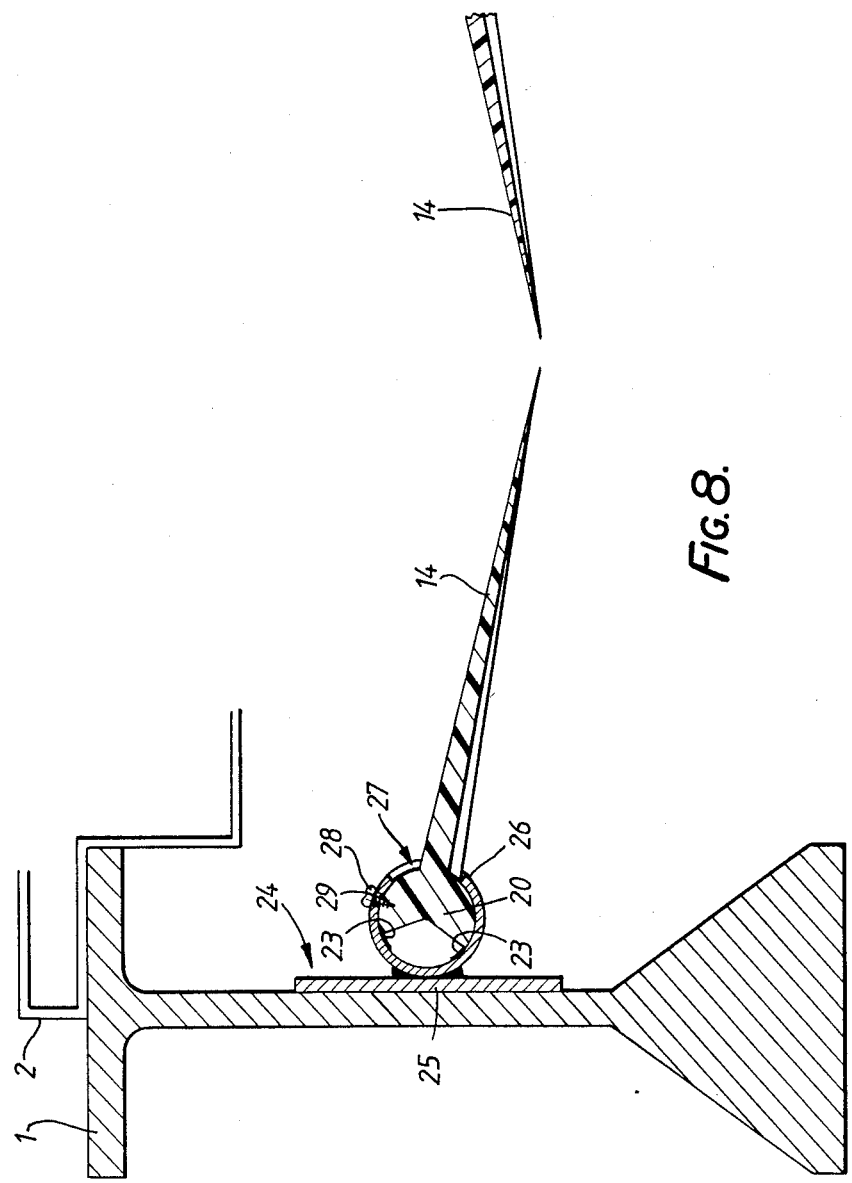
FIG. 8 is a more detailed view of part of this assembly, similar to FIG. 4.

The support portion 20 of the flap is located in the tube 26 so that the flap 14 projects through the slot 27 and extends obliquely downwards as shown in FIG. 8. The lips 23 on the support portion 20 are deflected by engagement with the internal surface of the tube and ensure that the support portion is a comparatively secure fit within the tube. The width of the slot 27 allows the angle of the flap to be adjusted to a limited extent, following which the flap is secured in position by bolts or pins 28 driven into the support portion 20 of the flap through apertures 29 formed at intervals along the tube 26. The ends of the tube 26 are closed by end pieces 30 to prevent the entry of particulate material that may be poured through the mouth of the hopper or of dust from that material.

In a resting, or undeflected condition, the free end of the flap lies closely adjacent to that of the flap on the facing side of the next beam. Depending on the length of the beams 1, there may be several flaps 14 arranged side-by-side along the beam, each flap having its own mounting plate 25.

In normal use, air is withdrawn from within the hopper as described above with reference to FIGS. 1 to 4. When particulate material is poured into the hopper, it falls onto some at least of the flaps 14 and causes them to bend downwards so that the material falls between the flaps and into the hopper. After the material has fallen into the hopper, the flaps return to the resting condition under their own resilience. When material is entering the hopper, dust inside the hopper is prevented from escaping by the flow of material and by the flow of air into the hopper. When the flow of material has ceased, the flow of air continues and continues to prevent the escape of dust.

The use of a comparatively soft material, such as rubber or polyurethane, for the flaps 14 reduces the extent to which particles of material rebound from the surfaces of the flaps when the material is being poured into the hopper and assists in preventing the formation of dust at the hopper mouth.

Although the beams 1 and grids 2 have been described as supporting the weight of lorries, it will be appreciated that if that is not to occur, for example, because delivery is to be by railway wagons the weight of which is supported on tracks, or because the receiving hoppers are so arranged that lorries back up to them and cannot drive over them, grids of a lighter construction may be used. Railway tracks may be supported on the beams 1. It is still preferred, however, to provide grids that will prevent personnel from falling into the hoppers.

It will be appreciated that the overall dimensions of the receiving hopper are largely a matter of the design of the individual installation, and that the optimum length, width, thickness, elastic properties, and setting of the flaps 14 may vary widely depending on the material that the hopper is to receive.

I claim:

1. A hopper assembly having means defining an upwardly-facing mouth for receiving granular or powder materials; a plurality of support members extending across said mouth; a plurality of resiliently flexible baffles arrayed in a plurality of rows, each row consisting of a plurality of baffles, each said baffle being generally flat and rectangular and being fixedly mounted at, a top edge portion along said supporting member, the baffles in a row extending obliquely downwards side-by-side from respective said top edge portions to respective free edges, each baffle being flexible from said top edge to said free edge; and means for adjusting the angle of obliquity to the horizontal of the top edge portion of said baffle independently and for securing the top edge portion at a desired angle; each baffle being arranged to use to be disposed with its free edge parallel to and in the vicinity of an edge portion of another member disposed on an adjacent said support member, and being so arranged that if material is to be received by the hopper assembly falls onto any said baffle the weight of the material tends to cause the baffle to flex and the free edge of the baffle to move away from the said other member, permitting the material to fall between them, and that the baffle then tends to return resiliently to its original position, where it assists in preventing or reducing the escape of material upwards from the hopper through the mouth.

2. A hopper assembly as claimed in claim 1, wherein two adjacent rows of resilient flexible baffles form a substantially array of generally V-shaped vertical cross-section, with the free edge partitions of the baffles along the centre of the array and the top edge portions of the baffles along the sides of the array, and wherein each baffle constitutes the said other member for a baffle in the other row.

3. A hopper assembly as claimed in claim 2, having two said arrays of baffles side by side, separated by a common supporting member to which the adjacent top edge portions of the baffles of both arrays are mounted.

4. A hopper assembly as claimed in claim 1, wherein the fixed edge portion of each baffle is mounted pivotably about a horizontal axis and adjustable means is provided for enabling the baffle to be prevented from pivoting under the action of gravity from any of a plurality of angular positions about the axis of the pivot.

5. A hopper assembly as claimed in claim 4, wherein the pivotal position of each baffle is determined by the effective length of one or more bolts extending between the baffle and a fixed member and adjustment can be effected by screwing a nut along each such bolt.

6. A hopper assembly as claimed in claim 4, wherein each baffle is so mounted as to permit adjustment of the distance from the axis of pivoting to the free edge.

7. A hopper assembly as claimed in claim 1, which comprises means for extracting air from the interior of said hopper assembly below the said baffles.

8. A hopper assembly as claimed in claim 1, wherein each resiliently flexible baffle comprises a sheet of elastomeric material.

9. A hopper assembly as claimed in claim 1, wherein each baffle comprises an upper layer of wear-resistant material and a lower layer of resilient material.

10. A hopper assembly as claimed in claim 1, wherein the fixed edge portion of each baffle is mounted in a support member which is shaped to permit restricted pivotal movement of the baffle about a horizontal axis and means is provided for securing the baffle in a desired pivotal position.

11. A hopper assembly as claimed in claim 10, wherein the fixed edge portion of each baffle is shaped to form a cylindrical support portion and the support member is a tube in which the support portion is located, the baffle extending from the tube through a slot in the wall of the tube.

12. A hopper assembly as claimed in claim 1, wherein each baffle comprises a sheet of material with stiffening ribs on one surface.

13. A hopper assembly as claimed in claim 12, wherein each baffle is moulded in one piece from an elastomeric material.

14. A hopper assembly having means defining an upwardly facing mouth for receiving granular or powder materials; a plurality of support members extending across said mouth; at least one resiliently flexible baffle extending obliquely downwards from a substantially fixed, generally horizontal extending top edge portion to a free edge portion; and another member disposed on an adjacent support member having an edge portion in the vicinity of and extending substantially parallel to the free edge portion of baffle, said fixed edge portion of the baffle being mounted in one said support member which is shaped to permit restricted pivotal movement of the baffle about a horizontal axis, said fixed edge portion of said baffle being shaped to form a cylindrical support portion and the support member being a tube in which the support portion is located, said baffle extending from the tube through a slot in the wall of the tube, and said assembly including means for securing the baffle in a desired pivotal position, the arrangement being such that if material to be received by the hopper assembly falls onto the baffle, its weight tends to cause the baffle to deflect away from the said other member, permitting the material to fall between the baffle and the other member, and that the baffle then returns or tends to return to its original position.

* * * * *

UNITED STATES PATENT AND TRADEMARK OFFICE
CERTIFICATE OF CORRECTION

PATENT NO. : 4,942,911

DATED : 24 July 1990

INVENTOR(S) : Abel Herbet

It is certified that error appears in the above-identified patent and that said Letters Patent is hereby corrected as shown below:

In column 4, line 5 delete "dustladen" and insert --dust-laden--.

In column 6, line 18 delete the comma.

In column 6, line 26, before "said" insert --each--.

In column 6, line 27, delete "to" and insert --in--.

In column 6, line 42, after "substantially" insert --symmetrical--.

In column 6, line 43, delete "partitions" and insert --portions--.

Signed and Sealed this

Twelfth Day of May, 1992

Attest:

DOUGLAS B. COMER

*Attesting Officer*   *Acting Commissioner of Patents and Trademarks*